United States Patent
Amendolea et al.

(10) Patent No.: US 7,320,485 B2
(45) Date of Patent: Jan. 22, 2008

(54) V INSERT EDGE CONTOUR

(75) Inventors: Richard M. Amendolea, Canfield, OH (US); Carl L. Johns, Saltsburg, PA (US); Gary E. Miller, Vandergrift, PA (US)

(73) Assignee: Breeze-Torca Products, LLC, Auburn Hills, MI (US)

( * ) Notice: Subject to any disclaimer, the term of this patent is extended or adjusted under 35 U.S.C. 154(b) by 154 days.

(21) Appl. No.: 10/967,623

(22) Filed: Oct. 18, 2004

(65) Prior Publication Data
US 2005/0108859 A1  May 26, 2005

Related U.S. Application Data

(60) Provisional application No. 60/511,839, filed on Oct. 16, 2003.

(51) Int. Cl.
*F16L 23/00* (2006.01)
(52) U.S. Cl. .................................. 285/407; 285/365
(58) Field of Classification Search ................ 285/365, 285/367, 407, 411, 413, 424, 110–111
See application file for complete search history.

(56) References Cited
U.S. PATENT DOCUMENTS

| | | | | |
|---|---|---|---|---|
| 1,190,350 A | * | 7/1916 | Williams | 405/121 |
| 2,602,678 A | * | 7/1952 | Mahoff et al. | 285/408 |
| 2,775,806 A | * | 1/1957 | Love | 24/271 |
| 2,828,986 A | * | 4/1958 | Mahoff et al. | 285/233 |
| 3,013,821 A | * | 12/1961 | Bogan | 285/407 |
| 3,019,036 A | * | 1/1962 | Stanger | 285/18 |
| 3,099,060 A | * | 7/1963 | Smith | 24/279 |
| 3,235,293 A | * | 2/1966 | Condon | 285/233 |
| 3,351,352 A | * | 11/1967 | Blakeley et al. | 277/615 |
| 3,455,582 A | * | 7/1969 | Von Hoevel | 285/302 |
| 3,674,291 A | * | 7/1972 | Goldberg | 403/338 |
| 3,820,831 A | * | 6/1974 | Swedelius | 285/367 |
| 3,861,723 A | * | 1/1975 | Kunz et al. | 285/410 |
| 5,000,487 A | * | 3/1991 | Maiville et al. | 285/2 |
| 5,470,114 A | * | 11/1995 | Umney et al. | 285/367 |
| 5,658,021 A | * | 8/1997 | Matsumoto et al. | 285/112 |

* cited by examiner

*Primary Examiner*—Aaron Dunwoody
*Assistant Examiner*—Fannie C. Kee
(74) *Attorney, Agent, or Firm*—Reising, Ethington, Barnes, Kisselle, P.C.

(57) ABSTRACT

A V-band clamp that includes an annular band having an inner surface and an outer surface. A latch assembly is attached to the outer surface of the band for attaching objects together. A plurality of insert segments are attached to the inner surface of the band, wherein each segment includes a contour edge for preventing damage to objects being joined together during installation of the V-band clamp.

12 Claims, 4 Drawing Sheets

V INSERT EDGE CONTOUR

CROSS REFERENCE TO RELATED APPLICATION

This application claims the benefit of United States Provisional Patent Application Ser. No. 60/511,839, filed Oct. 16, 2003, which is hereby incorporated by reference in its entirety.

BACKGROUND OF THE INVENTION

1. Field of the Invention

The present invention relates generally to band clamps and, more particularly, to a V-band clamp for mechanically fastening two objects having V-flanges together.

2. Description of Related Art

FIG. 1 shows a prior art V-band clamp 10 that includes a latch assembly 12 connected to a flexible, flat metal annular band 14 having an inner surface 16 and an outer surface 18. A plurality of prior art insert segments 15 (sometimes referred to in the industry as V-retainers) are circumferentially attached to the inner surface 16 of the band 14. The band 14 having a first end portion 20 and a second end portion 22 is adapted to mechanically attach objects having V-flanges together, wherein each portion 20, 22 forms a first loop 20' and a second loop 22', respectively, by a portion of the band 14 being bent back and attached to the outer surface 18 of the band 14. The attachment of a portion of the band 14 to the outer surface 18 and the attachment of the segments 15 to the inner surface 16 of the band 14 can be done by spot welding, crimping, mechanical fasteners, such as rivets, or by any other similar means known in the art.

Referring to FIG. 1, the latch assembly 12 includes a T-bolt 24 having a head portion 26 and a shank portion 28, a trunnion 30, and a nut 32. The head portion 26 of the T-bolt 24 is pivotably received within the first loop 20' of the band 14. The trunnion 30 is pivotably received within the second loop 22' of the band 14. The shank portion 28 of T-bolt 24 extends through a passageway (not shown) of the trunnion 30 and the nut 32 is received on the shank portion 28 of the T-bolt 24, wherein the latch assembly 12 is adapted to releasably couple the first end portion 20 to the second end portion 22 of the band 14.

With continued reference to FIG. 1, the insert segments 15 each having a first end 40 and a second end 42 are spaced apart on the inner surface 16 of the clamp 10, wherein two consecutive insert segments 15 are separated by a gap 36 defined on the inner surface 16 of the band 14. The insert segments 15 are typically arcuate shaped and made of a rigid metal. Referring to FIGS. 2 and 3, the prior art insert segment 15 includes a body 38 having a first side wall 44 and a second side wall 48 attached to a bottom wall 46, wherein the walls 44, 46, and 48 define a channel 50 therein. A first flange 54 and a second flange 56 are attached to the first side wall 44 and the second side wall 48, respectively, and extend outwardly therefrom. An end face 52 having a first edge 53a and a second edge 53b is present on walls 44, 46, and 48 and on flanges 54 and 56 at the first end 40 and the second end (not shown) of the body 38 of the insert segment 15. The channel 50 having an interior surface 51 is adapted to receive and hold together a pair of conduits C having peripheral end flanges F (referred to as V-flanges) that are joined together in the manner shown in FIGS. 4 and 5. The conduit C can include any objects having V-flanges F, such as hoses, tubing, or piping, wherein the V-flanges F can be mechanically joined or connected to each other.

In operation, the two conduits are attached, by joining the two V-flanges F together and inserting the joined V-flanges F into the channel 50 of each of the insert segments 15 on the flexible band 14 as shown in FIG. 5. Referring to FIG. 1, the band 14 is fastened around the V-flanges and the shank portion 28 of the T-bolt 24 is inserted through a passageway (not shown) in the trunnion 30. A nut 32 can be threaded on the shank portion 28 of the T-bolt 24 and rotated toward the trunnion 30, thereby drawing the end portions 20, 22 toward each other. Referring to FIGS. 1 and 5, as the end portions 20, 22 are drawn towards one another, an inward or radial force (represented by arrow R) is created by the tightening of the band 14, wherein a wedging action of the insert segments 15 transmits an axial load (represented by arrows A) on the side walls 44, 48, thereby compressing the two V-flanges F together for the life of the connection.

As seen in FIGS. 1-4, one drawback to the prior art V-band clamp 10 is that the edges 53a, 53b of the end face 52 on the first end 40 and the second end 42 of each segment 15 is generally sharp, particularly at the side walls 44 and 48, and has the potential of gouging or digging into the flange material during installation. This can occur when the joined V-flanges F do not freely slide over the gap 36 between each segment 15, and the first edge 53a of each segment 15 causes damage to the flanges F resulting in a permanently damaged or inferior connection. In some prior art solutions, the edges on each end of the segments are deburred or tumbled to remove the sharpness. However, deburring and tumbling are oftentimes unsuccessful in consistently removing all the sharp edges. In another prior art solution, each end of the segments is covered with a coating to minimize friction and the tendency of the edge to dig into the flanges. However, coatings add additional cost and can rub off during installation or use.

Therefore, it is an object of the present invention to overcome the above-mentioned deficiencies by eliminating the sharp edges on each segment of a V-band clamp, thereby preventing damage to the V-flanges F during installation and providing easier installation of the V-band clamp.

SUMMARY OF THE INVENTION

The present invention provides for a band clamp for coupling a pair of conduits having peripheral end flanges joined together. The clamp comprises an annular band having a first end portion and a second end portion and defining an inner surface and an outer surface and a latch assembly attached to the outer surface of the first end portion and the second end portion, wherein the latch assembly is adapted to releasably couple the first end portion to the second end portion of the band. A plurality of spaced apart insert segments having a first end and a second end are attached to the inner surface of the band. Each segment comprises two spaced side walls attached to a bottom wall and defining a channel therein, and a pair of flanges each attached to the side walls and extending outwardly therefrom. The channel having an interior surface is adapted to receive and hold together the joined end flanges of the pair of conduits. The first end and the second end of each segment having an end face comprises a contour edge, wherein the contour edge is present on at least the side walls and the bottom wall, thereby preventing damage to the end flanges of the pair of conduits during installation of the joined end flanges into the channel of each segment of the band clamp.

In a second embodiment of the present invention, the contour edge on the first end and second end of each segment comprises a taper which extends downward toward the inner surface of the band. The taper can extend between the interior surface and the end face at the first end and the second end of the segment. The taper can be one of a flat or rounded surface. In another embodiment, the first end and the second end of each of the side walls can flare outwardly, thereby forming a flaring cross-section within the channel of the segment.

The present invention provides for a method of forming a contour edge on an insert segment of a typical prior art V-band clamp, wherein each segment having a first end and a second end comprises two spaced side walls attached to a bottom wall and defining a channel therein. Each wall having an end face at the first end and the second end, wherein each end face comprises a first edge and a second edge. First, the contour edge is formed by removing the first edge of each end face on the first end and second end of the segment. The first end and the second end of each side wall can also be bent in a direction away from the channel, wherein the end face on the first end of each side wall also faces outwardly away from each other and the end face on the second end of each side wall faces outwardly away from each other.

DETAILED DESCRIPTION OF THE INVENTION

Figure 7:
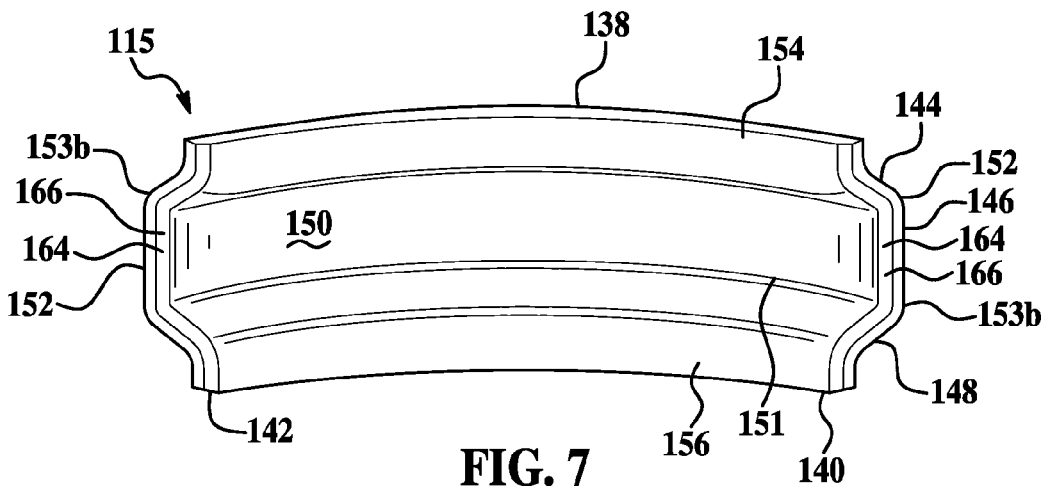
FIG. 7 is a front perspective view of an insert segment of the V-band clamp shown in FIG. 6.
Figure 8:
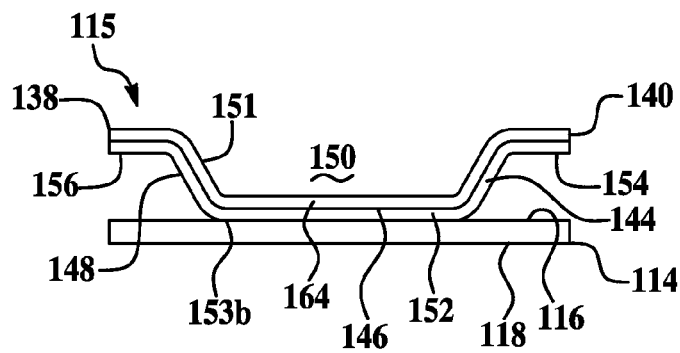
FIG. 8 is a front elevational view of a portion of the V-band clamp shown in FIG. 6 taken along lines 8-8 of FIG. 6.
Figure 9:
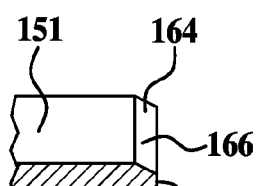
FIG. 9 is a side elevational view of a portion of an insert segment shown in FIG. 8 having a flat surface.
Figure 10:
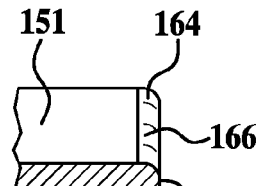
FIG. 10 is a side elevational view of a portion of an insert segment having a rounded surface.

Referring to FIGS. 6, 7, 8, and 14 the present invention provides for an insert segment 115 that is similar to the prior art insert segment 15 of the prior art V-band clamp 10, except that the first edge 53a on the first end 40 and the second end 42 of the prior art insert segment 15 is eliminated. Similar reference numerals will be used for similar parts; for instance, a V-band clamp 110 is similar to the V-band clamp 10. And likewise, a latch assembly 112 is connected to an annular band 114 that has a first end portion 120 and a second end portion 122 where each portion 120, 122 forms a similar first loop 120' and a second loop 122'. The band 114 having a similar inner surface 116 and a similar outer surface 118. The latch assembly 112 similarly including a T-bolt 124 having a head portion 126 and a shank portion 128, a trunnion 130, and a nut 132. A plurality of insert segments 115 are attached to the inner surface 116 of the annular band 114 in the same manner as insert segments 15 are attached, wherein a gap 136 is defined between two consecutive insert segments 115 (shown in FIGS. 6 and 14). The insert segment 115 includes a body 138 having a pair of side walls 144, 148 attached to a bottom wall 146 and a pair of flanges 154, 156 each attached to the respective side wall 144, 148 and extends outwardly therefrom, wherein the walls 144, 146 and 148 define a channel 150 therein. Referring to FIGS. 7 and 8, an end face 152 defining a contour edge 164 is present on walls 144, 146, and 148 and on flanges 154 and 156 at a first end 140 and a second end 142 (shown in FIG. 7) of the body 138 of the insert segment 115. By "contour" is meant at least a portion of the end face 152 having a curved or flat profile. The contour edge 164 of the insert segment 115 comprises a taper 166 (shown in FIG. 7) which extends downward toward the inner surface 116 (shown in FIG. 8) of the band 114 (shown in FIG. 8), wherein the taper 166 extends between an interior surface 151 and the end face 152 at the first end 140 and the second end 142 of the body 138 of the insert segment 115. The taper 166 can be one of a flat surface (shown in FIG. 9) or a rounded surface (shown in FIG. 10). The taper 166 eliminates the sharpness of the first edge 53a in the prior art insert segment 15, while leaving a second edge 153b thus minimizing potential gouging or digging into the flange material during installation.

Figure 1:
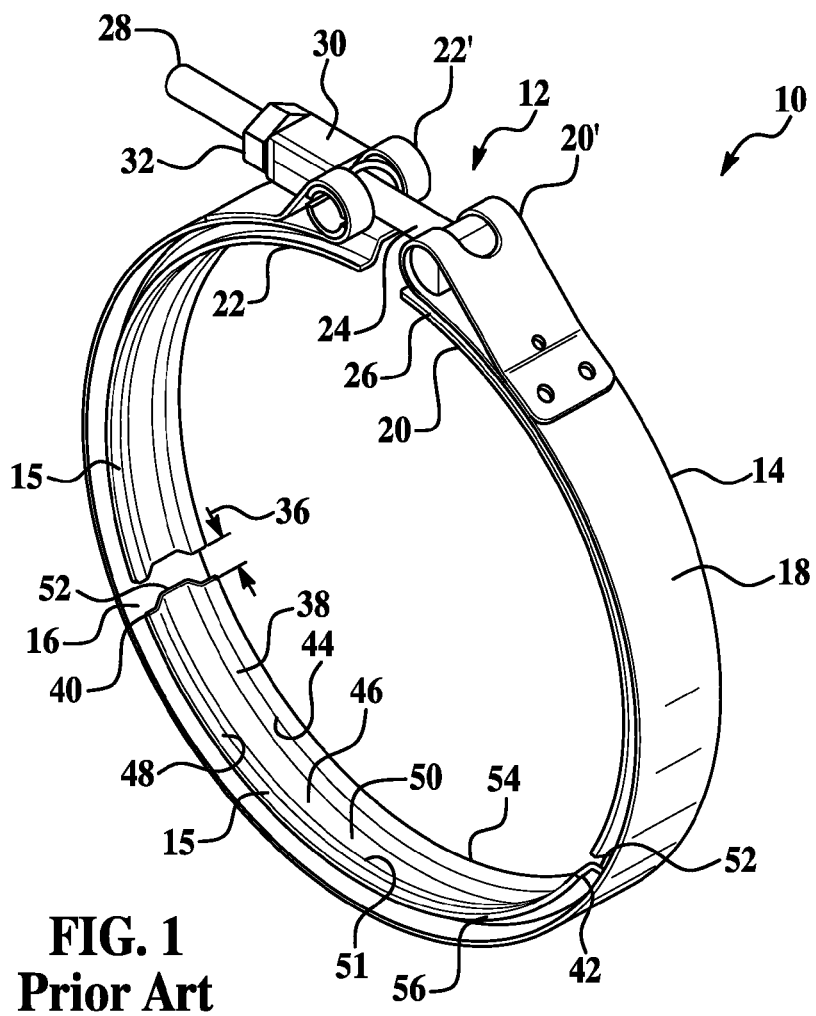
FIG. 1 is a perspective view of a prior art V-band clamp.
Figure 2:
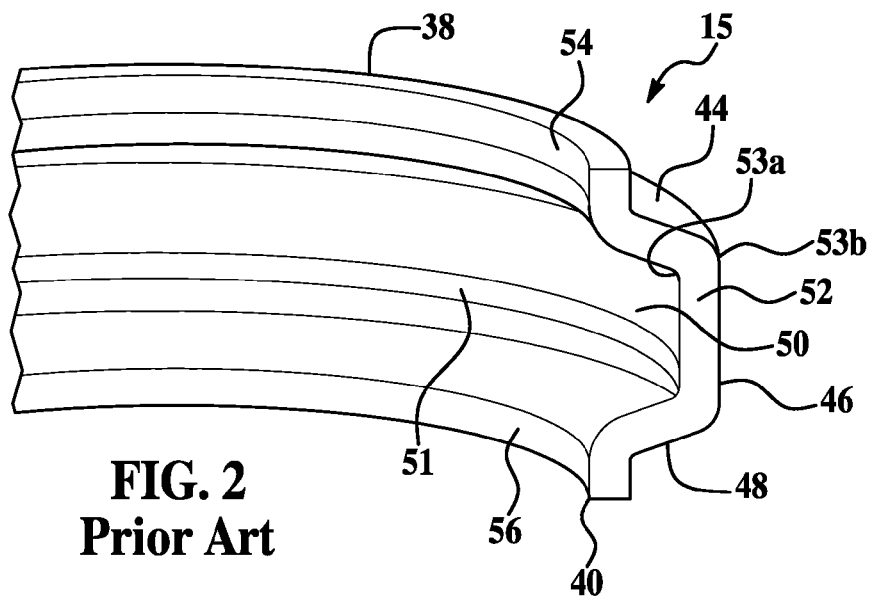
FIG. 2 is a front perspective view of a portion of a prior art insert segment of the V-band clamp shown in FIG. 1.
Figure 3:
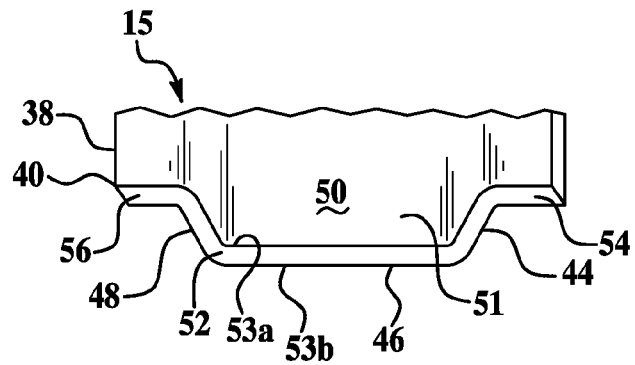
FIG. 3 is a front elevational view of a portion of the prior art insert segment shown in FIG. 1.
Figure 4:
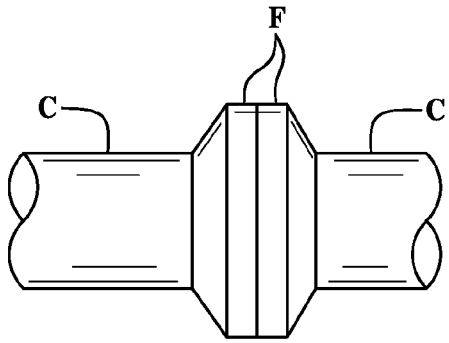
FIG. 4 is an elevational view of a pair of conduits having peripheral end flanges joined together.
Figure 5:
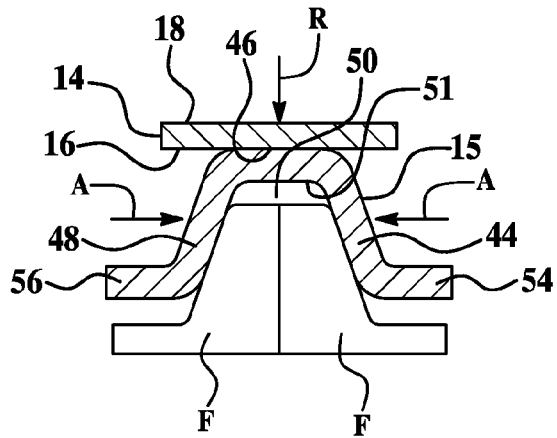
FIG. 5 is a sectional view of the prior art V-band clamp shown in FIG. 1 having joined end flanges of a pair of conduits inserted into the prior art insert segment shown in FIG. 2.
Figure 6:
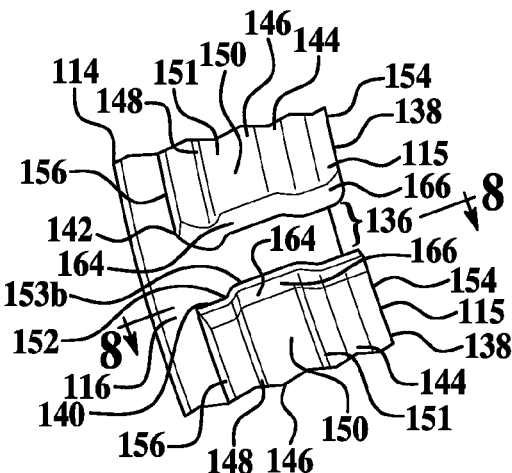
FIG. 6 is a front perspective view of a portion of a V-band clamp made in accordance with the present invention.
Figure 11:
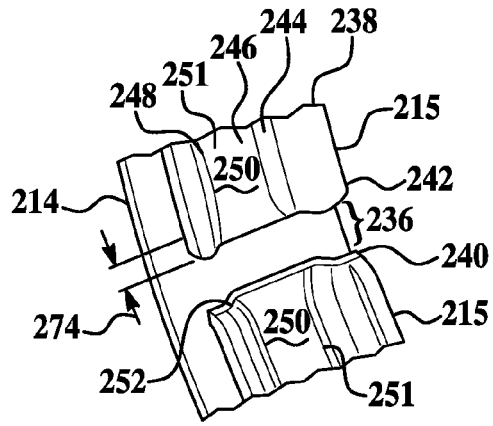
FIG. 11 is a front perspective view of a portion of a V-band clamp made in accordance with a second embodiment of the present invention.
Figure 12:
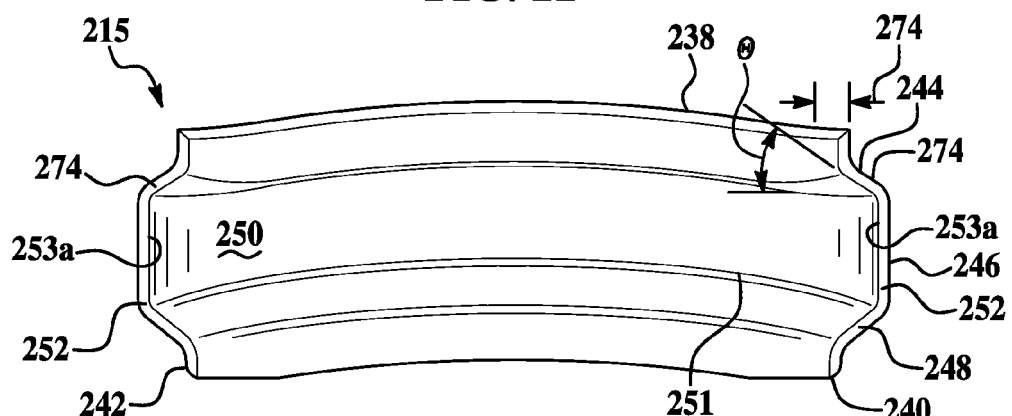
FIG. 12 is a front perspective view of an insert segment of the V-band clamp shown in FIG. 11.

FIGS. 11 and 12 show a second embodiment of an insert segment 215 that is similar to the prior art insert segment 15, except for the differences noted below. Similar reference numerals will be used for similar parts. A first end 240 and second end 242 of each side wall 244, 248 of the insert segment 215 flares outwardly, thereby forming a flaring cross-section 274 within a channel 250 of a body 238 of the insert segment 215. Each of the side walls 244, 248 of the flaring cross-section 274 forms a flare angle θ of at least 45 degrees (shown in FIG. 12). The flare angle θ is defined as the angle between an imaginary line extending perpendicularly upward from a bottom wall 246 and an interior surface 251 of each side wall 244, 248. The flaring cross-section 274 is accomplished by bending the first end 240 and the second end 242 of each side wall 244, 248 in a direction away from the channel 250, wherein an end face 252 on the first end 240 of each side wall 244, 248 faces outwardly away from each other, and the end face 252 on the second end 242 of each side wall 244, 248 faces outwardly away from each other. The flaring cross-section 274 reduces the contact of a first edge 253a (shown in FIG. 12) of the end face 252 of the side walls 244, 248, thereby allowing the joined V-flanges F of FIG. 4 to slide freely across an each gap 236 (shown in FIG. 11) and into each channel 250 of each segment 215 on a band 214.

Figure 13:
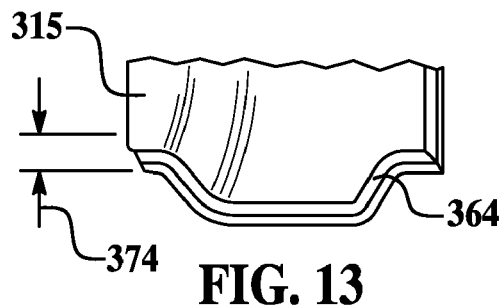
FIG. 13 is a front elevational view of a portion of the V-band clamp made in accordance with a third embodiment of the present invention.
Figure 14:
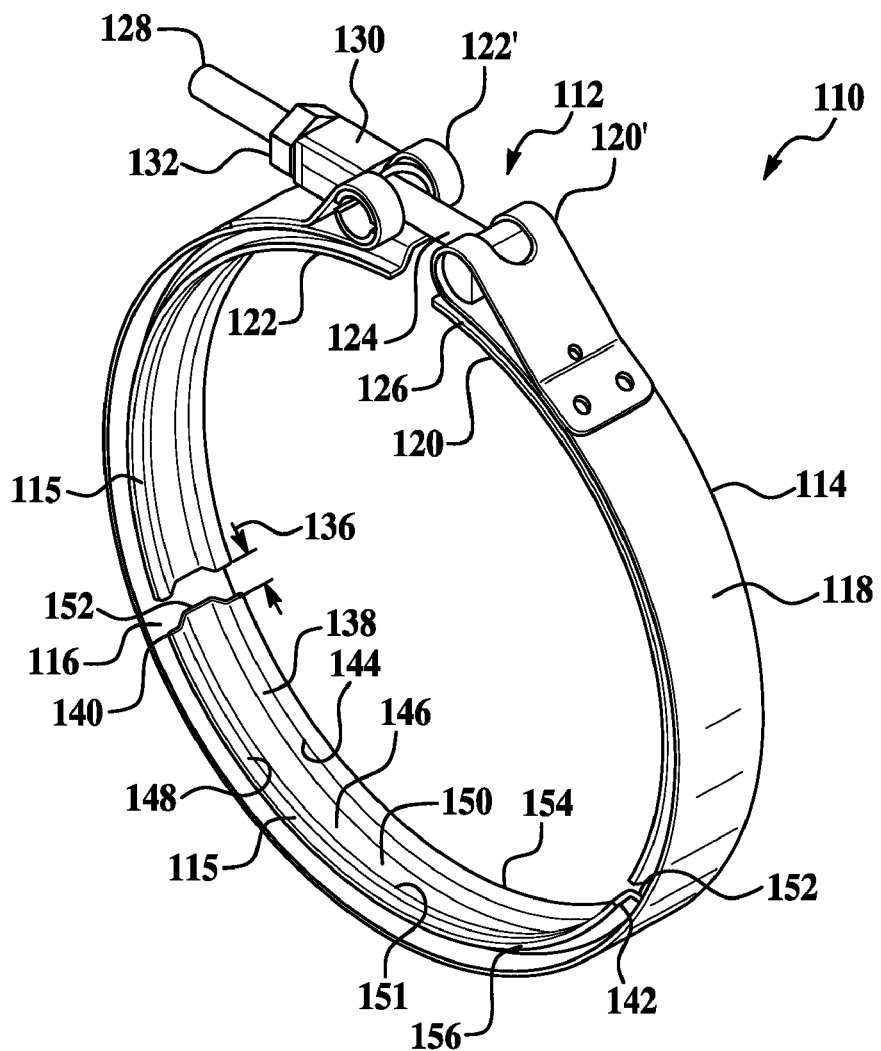
FIG. 14 is a perspective view of the V-band clamp shown in FIG. 6.

FIG. 13 shows another embodiment of the present invention, wherein an insert segment 315 comprises both a contour edge 364 of the insert segment 115 and a flaring cross-section 374 of insert the segment 215. Each insert segment 115, 215 and 315 can be made from a unitary piece of metal or polymeric material. Furthermore, the operation of a V-band clamp having insert segments 115, 215 or 315 attached thereto, function in a similar manner as the prior art V-band clamp 10 having the prior art insert segments 15.

The present invention also provides for a method of forming a contour edge on a prior art insert segment of a V-band clamp. First, a prior art insert segment 15 comprising an end face 52 having a first edge 53a and a second edge 53b is provided. Next, the first edge 53a of each end face 52 on the first end 40 and second end 42 of the segment 15 is removed. This can be accomplished by any mechanical means, such as coining, grinding or pressing. Alternatively, a contour edge can be formed on the insert segment during the molding process. Furthermore, the first end 40 and the second end 42 of each side wall 44, 48 can be bent in a direction away from the channel 50, wherein the end face 52 on the first end 40 of each side wall 44, 48 faces outwardly away from each other, and the end face 52 on the second end 42 of each side wall 44, 48 also faces outwardly away from each other.

This invention has been described with reference to the preferred embodiments. Obvious modifications and alterations will occur to others upon reading and understanding the preceding detailed description. It is intended that the invention be construed as including all such modifications and alterations.

The invention claimed is:

1. A band clamp for coupling a pair of conduits having peripheral end flanges joined together, said clamp comprising:

an annular band having a first end portion and a second end portion and defining an inner surface and an outer surface;

a latch assembly attached to said outer surface of said first end portion and said second end portion, wherein said latch assembly is adapted to releasably couple said first end portion to said second end portion of said band; and a plurality of insert segments attached to said inner surface of said band, wherein each said segment comprises two spaced side walls attached to a bottom wall, each segment having a first end and a second end and defining a channel therein, wherein the channel is adapted to receive and hold together the joined end flanges of the pair of conduits, said first end and said second end of said segment each having a thickness and a contour edge with a taper that gradually decreases the thickness of said segment toward respective first and second ends, wherein said contour edge is present on at least said side walls and said bottom wall thereby preventing damage to the end flanges of the pair of conduits during installation of the joined end flanges into the channel of each segment of the band clamp.

2. The band clamp as claimed in claim 1, wherein each segment further comprises a pair of flanges extending outwardly from said side walls.

3. The band clamp as claimed in claim 2, wherein said contour edge is also present on said flanges.

4. The band clamp as claimed in claim 1, wherein said taper extends downward toward said inner surface of said band.

5. The band clamp as claimed in claim 3, wherein said taper extends downward toward said inner surface of said band.

6. The band clamp as claimed in claim 4, wherein said taper is one of a flat or rounded surface.

7. The band clamp as claimed in claim 1, wherein said first end and said second end of each of said side walls flares outwardly further expanding said channel at said first and second ends, thereby forming a flaring cross-section within the channel of said segment.

8. The band clamp as claimed in claim 7, wherein each of said side walls of the flaring cross-section has a flare angle of at least 45 degrees.

9. The band clamp as claimed in claim 4, wherein said first end and said second end of each of said side walls flares outwardly further expanding said channel at said first and second ends, thereby forming a flaring cross-section within the channel of said segment.

10. The band clamp as claimed in claim 9, wherein each of said side walls of the flaring cross-section have a flare angle of at least 45 degrees.

11. The band clamp as claimed in claim 1, wherein said segments are arcuate shaped and wherein each of said segments are spaced apart from each other on the inner surface of said band, thereby defining a gap between two consecutively arranged segments.

12. The band clamp as claimed in claim 1, wherein said band is made from a unitary piece of flexible metal.

* * * * *